(12) United States Patent
Wu et al.

(10) Patent No.: US 7,078,127 B2
(45) Date of Patent: Jul. 18, 2006

(54) METHOD FOR PRODUCING POSITIVE ELECTRODE MATERIAL OF LI-ION SECONDARY BATTERY

(75) Inventors: She-Huang Wu, Taipei (TW); Yung-Jen Lin, Taipei (TW); Mu-Rong Yang, Taipei (TW); Wen-Jen Liu, Taipei (TW); Yi-Shiuan Chen, Taipei (TW)

(73) Assignee: Tatung Co., Ltd., Taipei (TW)

( * ) Notice: Subject to any disclaimer, the term of this patent is extended or adjusted under 35 U.S.C. 154(b) by 158 days.

(21) Appl. No.: 10/458,253

(22) Filed: Jun. 11, 2003

(65) Prior Publication Data

US 2003/0235527 A1  Dec. 25, 2003

(30) Foreign Application Priority Data

Jun. 21, 2002  (TW) .............................. 91113696 A

(51) Int. Cl.
*H01M 4/36* (2006.01)
*H01M 4/50* (2006.01)
*C01D 1/02* (2006.01)

(52) U.S. Cl. ................... 429/231.1; 429/224; 429/221; 429/223; 429/231.3; 429/231.95; 423/594.2; 423/594.4; 423/596; 423/599

(58) Field of Classification Search ............. 429/231.1, 429/224, 221, 223, 231.3, 231.95; 423/594.2, 423/594.4, 596, 599
See application file for complete search history.

(56) References Cited

U.S. PATENT DOCUMENTS 6,110,442 A * 8/2000 Xia et al. .................... 423/599
6,306,542 B1 * 10/2001 Nakano et al. ............. 429/224
6,692,665 B1 * 2/2004 Shima et al. ............ 252/518.1

* cited by examiner

*Primary Examiner*—Patrick Joseph Ryan
*Assistant Examiner*—Angela J. Martin
(74) *Attorney, Agent, or Firm*—Bacon & Thomas, PLLC

(57) ABSTRACT

A method for producing a positive electrode material adapted to the Li-ion secondary batteries is disclosed. The produced material has the following formula (I), $$Li_{1+x}Mn_{2-y}M_yO_4 \quad (I)$$

wherein M is Mg, Al, Cr, Fe, Co, or Ni; $0 \leq x \leq 0.4$, and $0 \leq y \leq 0.2$. The method is achieved by co-precipitating a gel salts with an organic acid. First, salts of Li, Mn and M are mixed with at least a solvent to form an initial solution. The mole ratio of Li, Mn and M ions in their respective salts is $(1+x):(2-y):y$. Next, at least a chelate is added into the initial solution to form a suspension, which is then filtered to obtain a co-precipitate. Finally, the co-precipitate is calcined and heated to obtain the final product.

11 Claims, 2 Drawing Sheets

METHOD FOR PRODUCING POSITIVE ELECTRODE MATERIAL OF LI-ION SECONDARY BATTERY

BACKGROUND OF THE INVENTION

1. Field of the Invention

The present invention relates to a method for producing positive electrode materials of Li-ion secondary batteries, which are particularly suitable for being applied to mobile phones, portable computers, portable music players, etc.

2. Related Prior Art

The first commercialized lithium battery was developed by Japanese Sony Co. in 1990, in which a compound enabling Li ion to move in and out was used to form the negative electrode and replaced traditional lithium metal. Such secondary battery was rechargeable and safe in use. For the secondary battery, the positive electrode is usually made from a strong oxidant, for example, $LiCoO_2$, $LiNiO_2$ and $LiMn_2O_4$, the negative electrode is carbon, and the electrolyte is a non-aqueous solvent. Currently, the $LiCoO_2$ battery is the major power supply for portable electronic devices because of higher charge capacity thereof. The $LiNiO_2$ battery is disadvantageous in synthesis difficulties and poor heat stability. Compared with these two batteries, the $LiMn_2O_4$ battery is considered the best choice in cost, safety and environmental acceptance.

Traditionally, the solid-state reaction is used to produce the secondary batteries. However, the precursor powders have to be heated and grinded for a long time after mechanically blended, which may easily destroy their structure and thus reduces charge capacity.

In order to solve this problem, wet processes with advantages of easy blending, low-temperature synthesis and large specific surface area for reaction are applied to synthesize $LiMn_2O_4$ powders. The developed wet processes include sol-gel method, Pechini method and citric acid-gel method. Unfortunately, some drawbacks are still found in these wet processes, wherein the sol-gel method has to be carried out in an inert gas; the Pechini process is too expensive for mass production; and the drying procedure in the citric acid-gel method demands additional energy and cost.

Therefore, it is desirable to provide an improved method to mitigate and/or obviate the aforementioned problems.

SUMMARY OF THE INVENTION

The object of the present invention is to provide a simpler method for producing positive electrode materials of Li-ion secondary batteries. Accordingly, the batteries can exhibit good performances and be produced at lower costs.

In order to achieved the above objects, the positive electrode material of the following formula (I) is produced,

  (I)

wherein M is Mg, Al, Cr, Fe, Co, or Ni; $0 \leq x \leq 0.4$; and $0 \leq y \leq 0.2$. First, salts of Li, Mn and M are mixed with at least a solvent to form an initial solution. The mole ratio of Li, Mn and M ions in their respective salts is $(1+x):(2-y):y$. Next, at least a chelate is added into the initial solution to form a suspension, which is then filtered to obtain a co-precipitate. Finally, the co-precipitate is calcined and heated.

In the method aforementioned, the salts of Li, Mn and M are not restricted. For example, it could be nitrate, chloride, hydroxide, carbonate, or acetate.

The solvent used in the present invention can be water, methanol, ethanol, propanol, butanol, or combinations thereof. The chelate can be polybasic carboxylic acid, wherein citric acid, oxalic acid and tartaric acid are preferred. The chelate can react with the above salts to form complexes. In general, the mole ratio of the chelate to Li ion in the Li salt ranges from 1:1 to 5:1, and preferably from 1:1 to 3:1, which facilitates crystallization of the positive electrode material.

The coprecipitate can be calcined at 200° C.–400° C. for 1–4 hours and then heated at 600° C.–900° C. for 1–8 hours.

Other objects, advantages, and novel features of the invention will become more apparent from the following detailed description when taken in conjunction with the accompanying drawings.

DETAILED DESCRIPTION OF THE PREFERRED EMBODIMENTS

The present invention provides a method for producing a positive electrode material of the following formula (I),

  (I)

wherein Li is lithium; Mn is manganese; M is magnesium (Mg), aluminum (Al), chromium (Cr), iron (Fe), cobalt (Co) or nickel (Ni); $0 \leq x \leq 0.4$, and $0 \leq y \leq 0.2$. This positive electrode material is adapted to a Li-ion secondary battery and can be produced by co-precipitating a gel of salts with an organic acid. Two significant advantages in the method of the present invention are: (1) all the procedures can be carried out under atmosoheric conditions; (2) product with high specific surface area can be formed so that the current rate can be increased and, (3) the ratio of Li/Mn is easily controlled.

Figure 1:
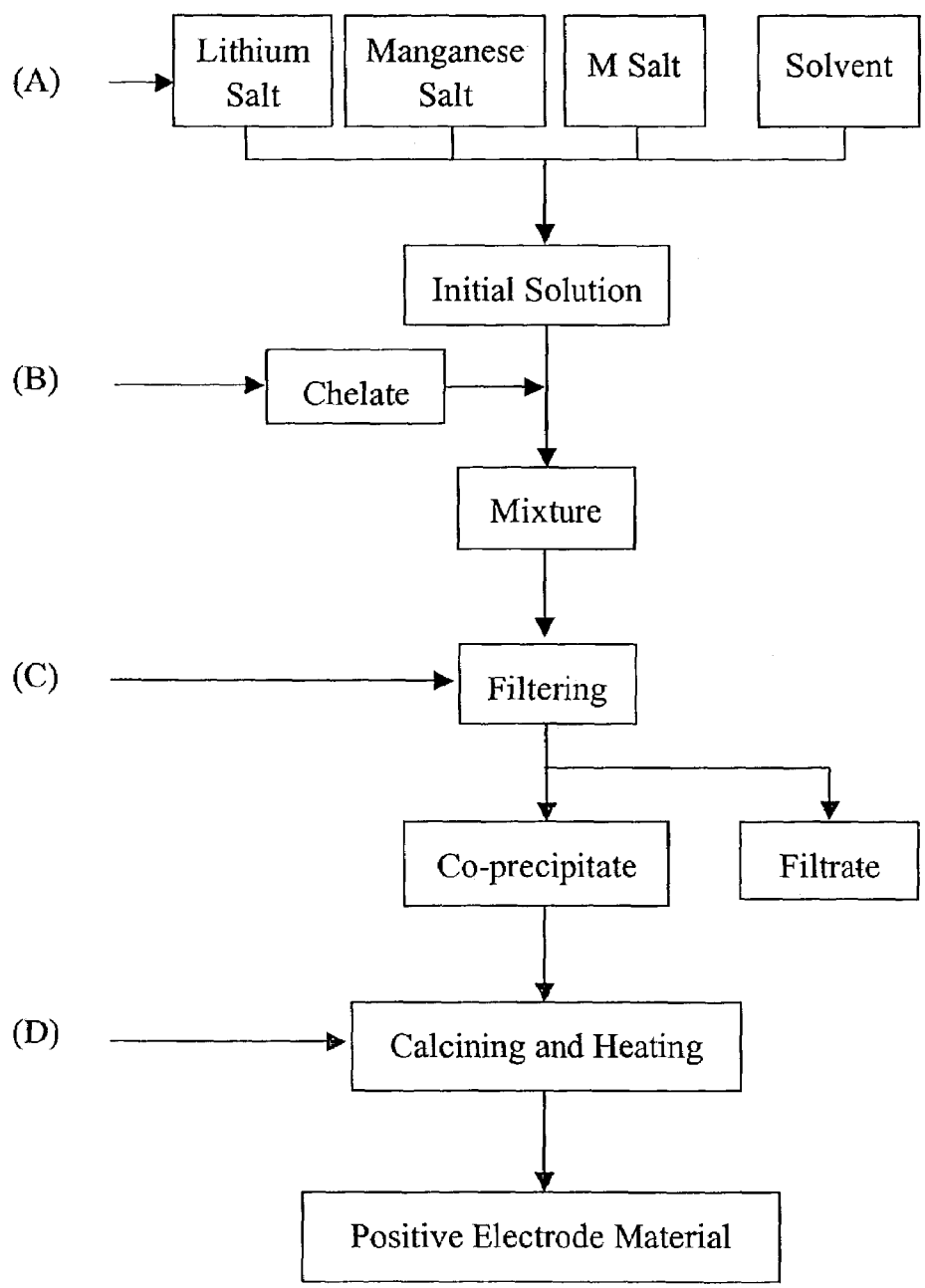
FIG. 1 is a flow diagram for producing the positive electrode material in accordance with the present invention.

FIG. 1 shows a flow diagram for producing the positive electrode material according to the present invention. In step (A), salts of Li, Mn and M are first mixed with at least a solvent to form an initial solution. The salts of Li, Mn and M can be nitrate, chloride, hydroxide, carbonate, or acetate thereof. The mole ratio of Li, Mn and M ions in their respective salts is $(1+x):(2-y):y$. The solvent can be water, methanol, ethanol, propanol and butanol, or mixture thereof.

In step (B), at least a chelate is added into the initial solution to produce a co-precipitate through a complex reaction and thus form a suspension. By well dispersing the Li and Mn ions in the initial solution, the stoichiometric ratio of the Li and Mn ions in the complex co-precipitate may be nearly the same as that in the initial solution.

The chelate can be polybasic carboxylic acid, such as citric acid, oxalic acid and tartaric acid. In general, the mole ratio of the chelate to Li ion in the Li salt ranges from 1:1 to 5:1, and preferably from 1:1 to 3:1, which will facilitate crystallization of the positive electrode material. In case of less chelate added, undesired by-product may be formed in the co-precipitate.

Since being slightly dissolved in the solvent, the co-precipitate can be obtained by simply filtering the suspension without time-consuming distillation, as shown in step (C). In step (D), a well-crystallized material adapted to the positive electrode can be obtained by calcining the co-precipitate at 200° C.–400° C. for 1–4 hours and then heating at 600° C.–900° C. for 1–8 hours.

When used in a Li-ion secondary battery, the positive electrode material of the present invention could be mixed with carbon black and polyvinylidene fluoride binder, which is then coated on aluminum foils to serve as positive electrodes. Lithium foils are provided as negative electrodes. By arranging the coated aluminum foils and the lithium foils in a non-aqueous electrolyte and separating them with a separator, tests can be carried out by charging/discharging between 4.3 and 3.6 V with current of C/3.

COMPARATIVE EXAMPLE 1

According to the traditional solid-state reaction, manganese acetate and lithium acetate are stoichiometrically mixed. The mixture is then calcined in an $Al_2O_3$ crucible at 350° C. for 24 hours, and then heated at 800° C. for 72 hours. After being cooled down to room temperature for 24 hours, the $LiMn_2O_4$ compound is obtained.

COMPARATIVE EXAMPLE 2

According to Pechini method, three main reactions, forming metallic acid chelate, esterification and polymerization, are carried out to produce the polymeric precursors. The detailed procedures can be referred to Liu et. al., *J. Electrochem. Soc.*, Vol. 143, No. 879, 1996. The precursors are then calcined at 210° C. for 6 hours and heated at 800° C. for 8 hours. Finally, the product is gradually cooled down to room temperature at a rate about 1° C./min.

COMPARATIVE EXAMPLE 3

According to the citric acid-gel method, lithium nitrate, manganese nitrate and citric acid are dissolved in de-ionized water. The mole ratio of Li ion, Mn ion and citric acid is 0.4:0.7:1.0. The mixture is then mixed well by stirring at 75° C. for 0.5 hour. When complex reaction occurs, the solution immediately transforms into a gel, which is then heated to remove water and dried powders are obtained. The powders is then calcined at 300° C. for 6 hours, and heated at 800° C. for 8 hours. Finally, the product is gradually cooled down to room temperature in a rate of 1° C./min.

EXAMPLE 1

Lithium nitrate (0.106 moles) and manganese acetate (0.2 mole) are firstly dissolved in ethanol (100 ml). Citric acid (in ethanol) is then added to form a suspension. After being stirred for 1 hour, the suspension is filtered to obtain a co-precipitate, i.e., Li/Mn citrate precursor. The co-precipitate is then calcined in a furnace at 300° C. for 2 hours, and heated to 800° C. for 4 hours. Finally, the product is gradually cooled down to room temperature in a rate of 1° C./min.

EXAMPLE 2

Repeat procedures of Example 1, but other metal ions are added to obtain compound of $Li_{1.06}Mn_{2-y}M_yO_4$, wherein y is 0.15 if M is Co, and y is 0.05 if M is Ni.

Figure 2:
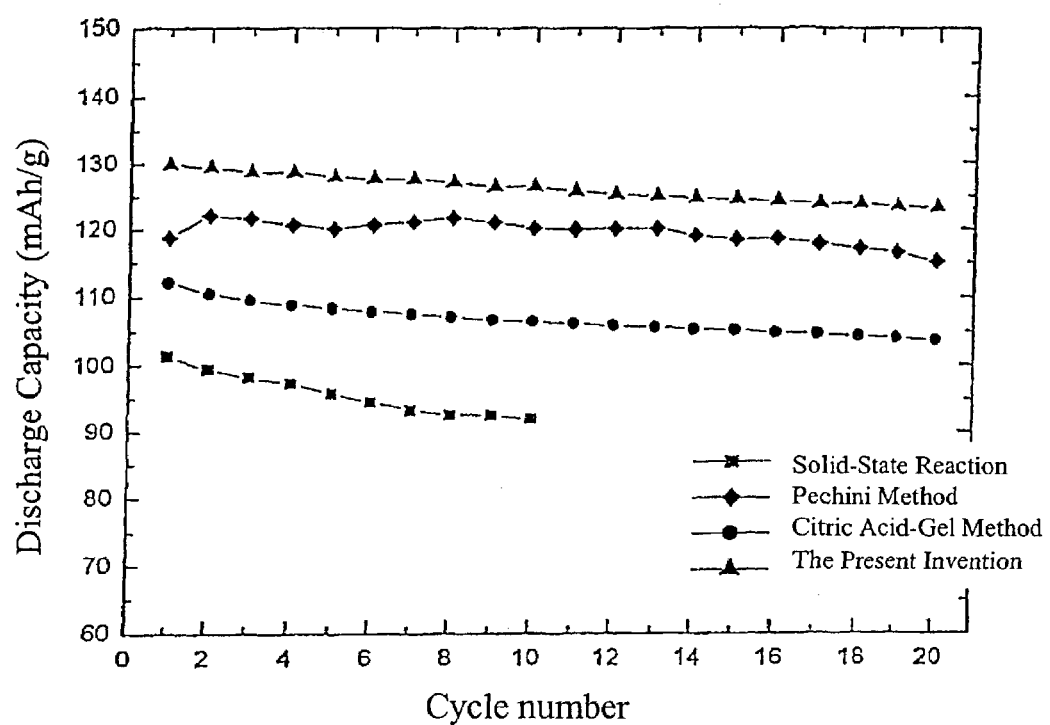
FIG. 2 shows the cycling performances of various $LiMn_2O_4$ batteries respectively made by solid-state reaction, Pechini method, citric acid-gel method and the method of the present invention.

In order to compare performances of the above products, carbon black (13 wt. %) and polyvinylidene fluoride binder (7 wt. %) are mixed with the coprecipitate, which is then coated on aluminum foils to serve as positive electrodes. Lithium foils are provided as negative electrodes. By arranging the coated aluminum foils and the lithium foils in a non-aqueous electrolyte and separating them with a separator, tests can be carried out by charging/discharging between 4.3 and 3.6 V with current rate of C/3. As shown in FIG. 2, the battery containing the material made by the method of the present invention exhibits higher charge capacities and better cycling stability than those materials made by traditional methods.

Although the present invention has been explained in relation to its preferred embodiment, it is to be understood that many other possible modifications and variations can be made without departing from the scope of the invention as hereinafter claimed.

What is claimed is:

1. A method for producing a positive electrode material of the formula (I), $$Li_{1+x}Mn_{2-y}M_yO_4 \qquad (I)$$

wherein M is Mg, Al, Cr, Fe, Co, or Ni, $0 \leq x \leq 0.4$, and $0 \leq y \leq 0.2$ comprising steps of:
   (A) mixing salts of Li, Mn and M with at least a solvent to form an initial solution, wherein the mole ratio of Li, Mn, and M ions contained in their respective salts is $(1+x):(2-y):y$;
   (B) adding at least a chelate into said initial solution to form a suspension, wherein the mole ratio of said chelate to Li ion in said Li salt ranges from 1:1 to 5:1;
   (C) filtering said suspension to obtain a co-precipitate; and
   (D) calcining and heating said co-precipitate.

2. The method as claimed in claim 1, wherein said Li salt is selected from the group consisting of nitrate, chloride, hydroxide, carbonate and acetate.

3. The method as claimed in claim 1, wherein said Mn salt is selected from the group consisting of nitrate, chloride, hydroxide, carbonate and acetate.

4. The method as claimed in claim 1, wherein said M salt is selected from the group consisting of nitrate, chloride, hydroxide, carbonate and acetate.

5. The method as claimed in claim 1, wherein said solvent is selected from the group consisting of water, methanol, ethanol, propanol, butanol and combinations thereof.

6. The method as claimed in claim 1, wherein said chelate is selected from the groups consisting of citric acid, oxalic acid, tartaric acid, and combinations thereof.

7. The method as claimed in claim 1, wherein the mole ratio of said chelate to Li ion in said Li salt ranges from 1:1 to 5:1.

8. The method as claimed in claim 1, wherein said co-precipitates is calcined at 200° C.–900° C.

9. The method as claimed in claim 1, wherein said co-precipitate is calcined for 1 to 4 hours.

10. The method as claimed in claim 1, wherein said co-precipitates is calcined at 600° C.–900° C.

11. The method as claimed in claim 1, wherein said co-precipitate is calcined for 1 to 8 hours.

* * * * *